(12) United States Patent
Joyce et al.

(10) Patent No.: US 9,109,118 B2
(45) Date of Patent: *Aug. 18, 2015

(54) CELLULOSIC INCLUSION THERMOPLASTIC COMPOSITION AND MOLDING THEREOF

(71) Applicants: Innovative Plastics and Molding, Lambertville, MI (US); RheTech, Inc., Whitmore Lake, MI (US)

(72) Inventors: Robert C. Joyce, Lambertville, MI (US); Andrew Hopkins, Sylvania, OH (US); Harutun George Karian, Brighton, MI (US)

(73) Assignee: RHETECH, INC., Labertville, MI (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/037,453

(22) Filed: Sep. 26, 2013

(65) Prior Publication Data
US 2014/0024746 A1  Jan. 23, 2014

Related U.S. Application Data

(63) Continuation of application No. 13/158,742, filed on Jun. 13, 2011, now Pat. No. 8,546,470, which is a continuation-in-part of application No. 12/321,093, filed on Jan. 15, 2009, now Pat. No. 7,994,241, which is a continuation-in-part of application No. 12/354,310, filed on Jan. 15, 2009, now abandoned.

(60) Provisional application No. 61/021,234, filed on Jan. 15, 2008.

(51) Int. Cl.
| | | |
|---|---|---|
| C08L 97/02 | (2006.01) | |
| C08L 1/00 | (2006.01) | |
| C08G 18/38 | (2006.01) | |
| C08K 7/14 | (2006.01) | |
| C08L 77/02 | (2006.01) | |
| C08L 77/06 | (2006.01) | |

(52) U.S. Cl.
CPC .............. *C08L 97/02* (2013.01); *C08G 2120/00* (2013.01); *C08K 7/14* (2013.01); *C08L 77/02* (2013.01); *C08L 77/06* (2013.01)

(58) Field of Classification Search
CPC .......... C08L 97/02; C08L 23/12; C08L 23/06
USPC ..................................... 524/13, 14
See application file for complete search history.

(56) References Cited

U.S. PATENT DOCUMENTS

| | | | | |
|---|---|---|---|---|
| 3,864,427 | A * | 2/1975 | Nakane et al. ............... 525/170 |
| 4,323,625 | A * | 4/1982 | Coran et al. ................ 428/361 |
| 4,403,007 | A * | 9/1983 | Coughlin ..................... 428/95 |
| 4,438,228 | A * | 3/1984 | Schenck ...................... 524/109 |
| 5,030,662 | A * | 7/1991 | Banerjie ....................... 521/43.5 |
| 5,075,359 | A * | 12/1991 | Castagna et al. ............. 524/13 |
| 5,346,773 | A * | 9/1994 | Simoens ..................... 428/476.9 |
| 5,403,667 | A * | 4/1995 | Simoens ..................... 428/479.6 |
| 5,882,745 | A * | 3/1999 | Mi et al. ..................... 428/15 |
| 5,948,524 | A | 9/1999 | Seethamraju et al. |
| 6,270,883 | B1 * | 8/2001 | Sears et al. ................. 428/292.1 |
| 6,294,602 | B1 * | 9/2001 | Shimo et al. ................ 524/394 |
| 6,376,584 | B1 * | 4/2002 | Galbo et al. ................. 524/102 |
| 6,682,789 | B2 * | 1/2004 | Godavarti et al. ........... 428/34 |
| 6,835,764 | B2 * | 12/2004 | Leckey et al. ............... 524/15 |
| 7,862,746 | B2 * | 1/2011 | Kaspers et al. ............. 252/397 |
| 8,122,996 | B2 * | 2/2012 | Kajihara et al. ............. 181/169 |
| 8,546,470 | B2 * | 10/2013 | Joyce et al. ................. 524/14 |
| 2003/0022962 | A1 * | 1/2003 | Cook et al. .................. 523/164 |
| 2004/0122133 | A1 * | 6/2004 | Mohanty et al. ............. 524/35 |
| 2004/0126515 | A1 * | 7/2004 | Yarmoska .................... 428/34.1 |
| 2005/0154094 | A1 * | 7/2005 | Maeda et al. ................. 524/35 |
| 2006/0084764 | A1 * | 4/2006 | Hanna et al. ................. 525/242 |
| 2006/0091578 | A1 * | 5/2006 | Bravo et al. ................. 264/122 |
| 2007/0027234 | A1 * | 2/2007 | Sigworth et al. ............. 524/13 |

(Continued)

FOREIGN PATENT DOCUMENTS

| | | |
|---|---|---|
| DE | 2427080 | 12/1975 |
| EP | 0319589 | 6/1989 |

(Continued)

OTHER PUBLICATIONS

Injection Molding Handbook: The Complete Molding Operation Technology, Performance, Economics Edited by Donald V. Rosato and Dominick V. Rosato, Champman & Hall, Norwell, Massachusetts, 2nd Edition, 1999.
The Efficiency of Cellulosic Fillers in Common Thermoplastics. Part 1. Filling Without Processing Aids or Coupling Agents, C. Klason, J. Kub, H-E Stormvall, International Journal of Polymric Materials, 10(3), pp. 159-187, 1984.
Wood-Plastic Composites as Promising Green-Composities for Automotive Industries Alireza Ashori, Bioresource Technology 99, pp. 4661-4667, 2008.
The Nature of Adhesion in Composites of Modified Cellulose Fibers and Polypropylene Johan M. Felix and Paul Gatenholm, Journal of Applied Polymer Sciene 42, pp. 609-620, 1991.
Role of Maleated Coupling Agents on the Interface Adhesion of Polyproplene-Wood Compsites, C.A. Correa, C.A. Razzino and E. Hage, Jr., Journal of Thermoplastic Composite Materials 20, pp. 323-339, 2007.

(Continued)

*Primary Examiner* — Liam J Heincer
(74) *Attorney, Agent, or Firm* — Blue Filament Law PLLC; Avery N. Goldstein

(57) ABSTRACT

A cellulosic inclusion-thermoplastic composition that includes cellulosic inclusions and a thermoplastic polyolefin that forms a matrix in which the cellulosic inclusions are dispersed. A maleated polymer and a polar thermoplastic polymer resin of a polyamide or polyester are provided to improve adhesion between the cellulosic inclusions and the thermoplastic polyolefin. The polar thermoplastic polymer resin is characterized by a melting temperature greater than that of the thermoplastic polyolefin. The composition as provided has increased break tensile strength relative to a composition devoid of the polar thermoplastic polymer resin but otherwise is unchanged. The break tensile is measured at 23° Celsius and at an elongation rate of 50 millimeters per minute.

25 Claims, 7 Drawing Sheets

(56) References Cited

U.S. PATENT DOCUMENTS

| | | | |
|---|---|---|---|
| 2007/0208110 A1* | 9/2007 | Sigworth et al. | 524/13 |
| 2009/0182071 A1* | 7/2009 | Joyce | 524/13 |
| 2009/0321981 A1* | 12/2009 | Hopkins et al. | 264/128 |
| 2010/0062670 A1* | 3/2010 | Bastioli et al. | 442/327 |
| 2011/0245380 A1* | 10/2011 | Joyce et al. | 524/13 |

FOREIGN PATENT DOCUMENTS

| | | |
|---|---|---|
| EP | 0540026 | 5/1993 |
| EP | 0586212 | 3/1994 |
| FR | 2270311 | 12/1975 |
| FR | 2344101 | 10/1977 |
| FR | 2365019 | 4/1978 |
| FR | 2564374 | 11/1985 |
| GB | 2036148 | 6/1980 |
| GB | 2104903 | 3/1983 |
| GB | 2171953 | 9/1986 |
| GB | 2186655 | 8/1987 |
| WO | 9008020 | 7/1990 |
| WO | 9207022 | 4/1992 |

OTHER PUBLICATIONS

Wood Flour Filled Polypropylene Composites: Interfacial Adhesion and Micromechanical Deformations, Livia Danyadi, Karoly Renner, Janos Moczo and Bela Pukanszky, Polymer Eng. & Sci. 47, pp. 1246-1255, 2007.

Wood Flour Filled PP Composites: Compatibilization and Adhesion, Livia Danyadi, Tunde Janecska, Zoltan Szabo, Gabor Nagy, Janos Moczo and Bela Pukanszky, Composites Science and Technology 67, pp. 2838-2846 2007.

Polypropylene/Polyamide-6 Blends: Influence of Compatibilizing Agent on Interferance Domains, J. Roeder, R.V.B. Oliveria, M.C. Goncalves, V. Soldi and A.T.N. Pires, Polymer Testing 21, pp. 815-821 2003.

Wood/Plastic Composities(WPC) With Glass Fiber Reinforcement(GRF), Ghaus M. Rizvi and Hamid Semeralul, Antec 2006, pp. 224-227.

The Effect of Wood Extractives on the Thermal Stability of Different Wood Species, A.N. Shebani, A.J. van Reenen and M. Meincken. Thermochimica Acta 471, 43-50, 2008.

Effects of Wood Fiber Characteristics on Mechanical Properties of Wood/Polypropylene Composites, Nichole M. Stark and Robert Rowlands, Wood and Fiber Science 35(21), pp. 167-174, 2003.

Effect of Particle Size on Properties of Wood-Flour Reinforced Polypropylene Composities, Nicole M. Stark and Mark J. Berger 4th, International Conference on Woodfiber-plastic composites, 1997.

Composition of Wood-Plastic Composite Deck Boards: Thermoplastics, Anatole A. Klysov, John Wiley & Sons, NY, 1st Edition (2007).

* cited by examiner

CELLULOSIC INCLUSION THERMOPLASTIC COMPOSITION AND MOLDING THEREOF

CROSS-REFERENCE TO RELATED APPLICATIONS

This application is a continuation of U.S. patent application Ser. No. 13/158,742 filed Jun. 13, 2011, that in turn is a continuation in part of U.S. patent application Ser. No. 12/321,093 filed 15 Jan. 2009 and is a continuation in part of U.S. patent application Ser. No. 12/354,310 filed 15 Jan. 2009, both of which in turn claim priority benefit of U.S. Provisional Patent Application Ser. No. 61/021,234 filed Jan. 15, 2008, these prior applications are incorporated herein by reference.

FIELD OF THE INVENTION

The present invention in general relates to a composition containing cellulosic inclusions dispersed in a thermoplastic polymeric matrix and in particular to such a composition with improved distribution of the cellulosic inclusions and physical properties.

BACKGROUND OF THE INVENTION

It is typical in the plastics industry that reinforcements and fillers are used to improve the properties of said materials. Commonly, this is done to achieve improvement in physical properties such as tensile strength, flexural modulus and impact strength. Common fillers are talc, calcium carbonate and other minerals. By far the most common fibrous reinforcement is glass. Glass fibers impart high strength, dimensional stability and heat stability. There are commercial requirements that glass fiber and other mineral fillers cannot fully meet.

For example, glass fibers increase the density and cost of the material and abrade processing equipment. In addition, glass fibers are manmade, non-renewable materials with a considerable environmental impact.

Cellulosic materials have been evaluated as reinforcements in the past. In particular, wood fibers from a variety of sources have been extensively studied, together with the effects and improvements that common processing aids would be expected to impart to such systems. Typically, wood fibers have a lower density (1.3 g/cc) than glass fibers (2.6 g/cc) or other minerals (e.g. wollastonite, 2.9 g/cc). From an ecological point of view, wood fibers have a reduced environmental impact.

Chemically, wood fibers (and flours) are not pure cellulose, they contain at least two other major components, hemicellulose and lignin—with different varieties and different species of planting containing different ratios of these constituents. When the wood fibers are processed with thermoplastic resins at temperatures that exceed 200° C., the fibers exhibit severe discoloration and thermal degradation. There is also significant off-gassing and objectionable odors, principally due to impurities and the lignin that modify manufacturing process and create a worker safety concern. It has also been shown that processing temperatures above 200° C. reduce the physical property improvements delivered by the fibers (Klason, et al., *Inter. J. Polymeric Mater.*, Volume 10, p 175 (1984)). Furthermore, when the moisture present during the processing of the cellulosic materials is not controlled and/or eliminated, performance of the resultant composite is compromised. Management of moisture in the materials and the molded parts has proved costly and difficult, most commonly being achieved through fiber pre-processing or encapsulation of the fiber in the thermoplastic.

Wood fibers are hydrophilic materials that are poorly wet by molten hydrophobic thermoplastic polymers resulting in poor flow characteristics, difficult processability, and premature fiber pull-out, all of which leads to molded products with poor appearance and inferior mechanical properties. Property improvement has been addressed through the use of "compatibilizing" materials that adhere to both the polar fibers and the non-polar polymer resin. Most common has been the use of a maleic anhydride grafted polypropylene copolymer. See, for example, U.S. Pat. No. 5,948,524 and "Wood Flour Filled Polypropylene Composites: Interfacial Adhesion and Micromechanical Deformations", L. Danyadi et al., *Polym. Eng. & Sci.* 47(8), pp 1246-1255 (August 2007). Typically, wood flour-polypropylene composite (WPC) pellets are manufactured via compounding extrusion equipment followed by thermoplastic post-forming processes such as injection molding or profile extrusion. The engineering of desirable processing and physical properties into a WPC is further complicated by the addition of other substances such as reinforcing glass fiber filler, non-cellulosic particulate fillers, colorants and mold release compounds. As many physical property requirements are associated with homogeneous distribution of fillers and the matrix wetting of those fillers by the olefinic matrix, a chemical coupling package ideally is compatible not only with WPC itself, but also glass fiber filled and non-cellulosic particulate filled forms thereof.

None of the wood polymer composite materials that have been developed to date afford a completely satisfactory set of performance characteristics and as such are deficient for end-use applications in one or more of, e.g., poor physical properties, water resistance, undesirable odor, poor processability and/or excessive cost. These shortcomings stem from drawbacks in a forming process having poor melt flow characteristics due to inadequate adhesion between the dispersed wood fibers and thermoplastic polymer matrix at high wood fiber loading levels.

It is evident that to make a practical wood plastic composite end product, such as an injection molded spindle, toys, automotive parts, etc., the wood plastic composite material must be dried prior to processing. Additionally, wood plastic compounded pellets can be blended with other virgin or compounded polymers in pellet form. These additional pellets may have ingredients for reinforcement such as glass and or mineral, to produce various types of molded products that are tailored to particular end-use applications.

Thus, there exists a need for a thermoplastic composition with improved cellulosic inclusion-thermoplastic interactions relative to conventional composites so as to create superior performance molded articles.

SUMMARY OF THE INVENTION

A cellulosic inclusion-thermoplastic composition including cellulosic inclusions and a thermoplastic polyolefin that form a matrix in which the cellulosic inclusions are dispersed and a maleated polymer, and a polar thermoplastic polymer resin of a polyamide or polyester are provided to improve adhesion between the cellulosic inclusions and the thermoplastic polyolefin. The composition as provided has increased break tensile strength relative to a composition devoid of the polar thermoplastic polymer resin with the break tensile measured at 23° Celsius and at cross-head speed of 50 millimeters per minute.

A method of making a cellulosic inclusion-thermoplastic composition includes blending the thermoplastic polyolefin together with the cellulosic inclusions, maleated polymer, and the polar thermoplastic polymer resin to form a blend. The blend is then formed into a solid article in which the maleated polymer and the polar resin interact synergistically to promote adhesion between the cellulosic inclusions and the thermoplastic olefin as noted by an increased break tensile strength relative to an otherwise identical composition devoid of the resin. Melt blending and forming of the solid article by extruding are particularly beneficial aspects of the present invention. Melt blending at or below the temperature that is the melting point of the polar thermoplastic resin yet at or above the melting temperature for the thermoplastic olefin represents a particularly desirous processing condition.

A wood plastic composite composition is provided containing a semi crystalline polyolefin, maleic anhydride grafted polyolefin, a crystalline polar polymer, with cellulosic fibers at 1 to 80 wt percent that are processed at a reduced moisture yield product at 1 percent and preferably less than 0.5 percent final moisture content. This composition can produce molded article that exhibits an improved structural property and in particular break tensile strength that has been elusive to the wood composite industry.

To produce an extruded wood plastic composite pellet, in most instances, the wood fiber has gone through a drying process and must be reprocessed again before compounding because of the affinity of moisture, which can range from 8 to 14 percent in most instances. The reprocessing of the wood fiber, which is called classification, will help reduce moisture content and create a fiber size that will effectively distribute in the polymer matrix. The wood fibers are now of a flour consistency of a 20-120 mesh size. In addition, to classification, there are other forms of heat i.e. hot air or ovens that can help reduce wood flour moisture and prepare for compound extrusion. When compounding these ingredients, an intensive mixing or blending with a polymer, additives, lubricants, etc., to make a wood plastic composite pellet, more moisture removal is necessary. The compound extruder will have a single or multiple vents and or vacuums pull off or extract moisture and or gas. After the finished pellet is manufactured, it is a high loading of wood flour will lack dispersion of couplings, especially polypropylene, a thermoplastic polyolefin and it is difficult to wet out all fibers to promote adequate wood fiber adhesion. Furthermore, the process window needs to be increased with highly filled wood compositions, burning of wood fiber is common.

The crystalline, polyamide 6, which can be also a copolymer, is amorphous in the molten state but upon cooling to 200° C. it tends to crystallize very rapidly. Furthermore, the polyamide 6, will tend to be mostly in the crystalline state, particularly when it is in contact with the wood flour particles that have hydroxyl groups that form strong H-bonds and covalent amide bonds with the nitrogen atom on the PA-6 molecule. The interaction between the hydroxyl groups and the polyamide will help to reduce moisture generation at the surface of the wood plastic compounded pellets at elevated processing temperatures. The polyamide combined with 2 wt % MAPP will increase interfacial adhesion between the wood fiber and a polyolefin matrix. The increase in the interfacial adhesion will help prevent wood fiber pull-out at elevated service temperature. There was also a great improvement in the reduction in part warp age and sink and the ability to chemically foam a part.

It so happens that the PA-6 ingredient does not remain a separate fibrous resin after the initial compounding extrusion step. The extrudate is now an alloy that is of a heterogeneous composition. Consequently, the processing window of the wood plastic compound is increased by the addition of the crystalline polyamide. This is realized in the compounding of the wood plastic compound and when creating a hybrid injection molded extrudate to make a molded article. The compounding extrusion temperatures are set at 460-480° F. in the first mixing zone of the twin screw extruder to provide the necessary softening state of the polyamide to for an effective compatibilization bridge between the polyolefin and MAPP molecules. The heat temperature profile, not including the first zone, set at 460 to 480° F., has seven additional temperature zones in the heta profile, having subsequent step down reductions of approximately 10-20° F. This step down-heat profile provides the necessary mixing, dispersion and devolatization which result in the compatibilization of the wood flour, polyolefin, polyamide, lubrication and MAPP ingredients.

A combination of a wood plastic composite pellet with a virgin or co reinforced pellet at various loadings, referred to a hybrid blend, requires much lower processing temperatures with minimal shear for injection molding of parts. The injection molding temperatures are set at 370-390° F. with a 2.5 to 1 screw ratio. Hence, the crystallinity of the polyamide helps expand the hybrid blend processing window, including the wood, which requires less heat input and shear for melting and dispersing all ingredients. Hence, the invention provides an opportunity to load more fibrous reinforcement in a polyolefin based concentrate or composite for injection molding.

Consequently, in both compounding process and injection molding, wood plastic compound does not require excessive lubrication or higher melt flow base polymer to mold pellets, spindle, car parts, etc., which is a detriment to mechanical properties of the polyolefin based wood composite. The design of the wood plastic compound can also achieve superior strength to weight ratios and cost advantage for a compounded wood plastic compounded pellet that is let-down into injection molded parts. By drying or not drying the wood plastic compounded pellet you can produce a cellular or solid state molded article. You can also utilize a chemical blowing agent to help promote a cellular composition in either a compounded pellet or injection molded part. By introducing a gas blowing agent, i.e. nitrogen, at the injection molding machine nozzle and or die, you can help create a controlled cellular structure by pressure. Pressure is also effective in the wood plastic compounding process in squeezing moisture and or gas out of the extrudate to make pellets. If pellets are processed properly with an efficient die, minimal voids will be produced internally in the pellet. These voids hold moisture. Respective levels of pellet moisture is less than 0.5 percent. The moisture levels will reflect the compaction of the pellets. In addition, there will be no surface moisture due to the polymer skin that will be visible on the surface. These pellets can range in size from 0.100 to 0.250.

Figure 1A:
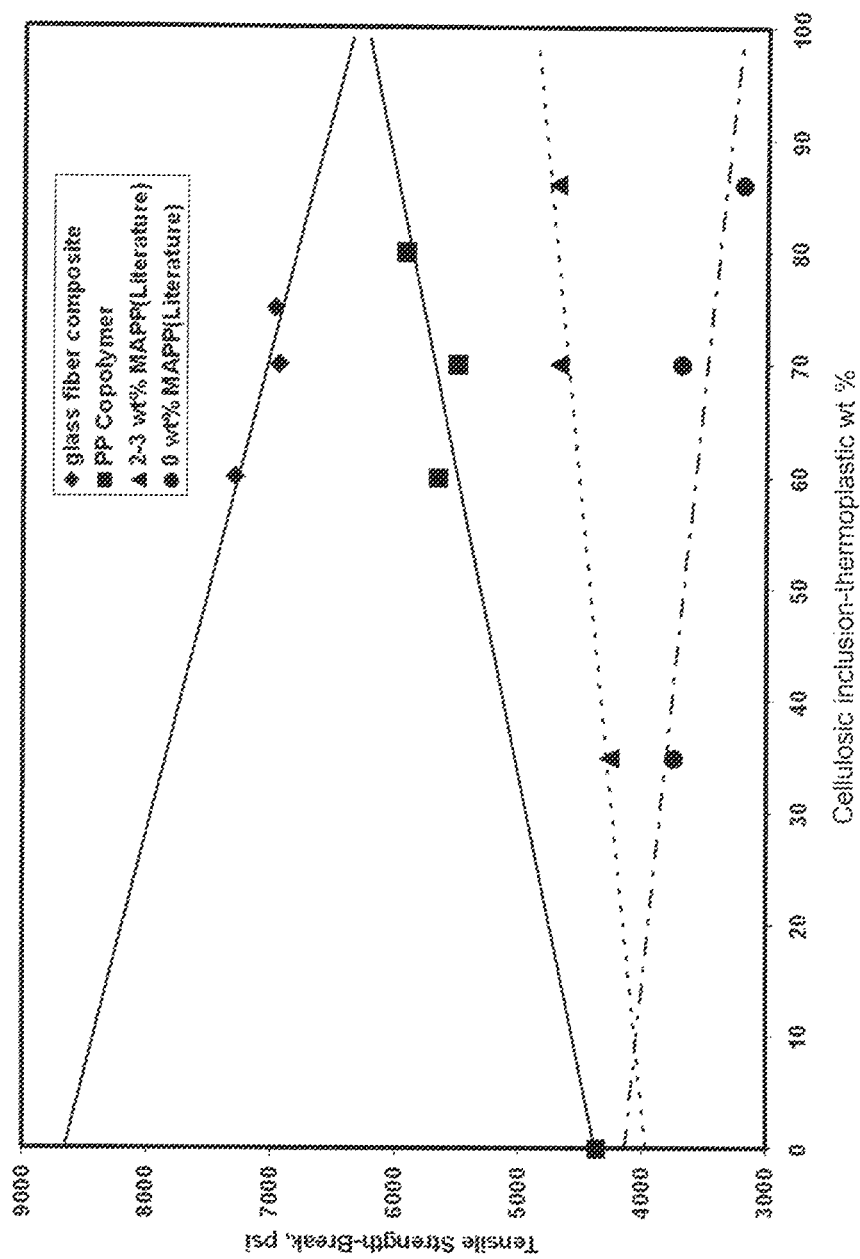
FIG. 1A is a bar graph of tensile strength for five duplicate samples each of a comparative I containing maleic anhydride grafted polyolefin and lacking the polar polymer resin component and relative to an inventive composition A per Table 1 collected at 23° Celsius and a cross-head speed of 50 millimeters/minute.
Figure 1B:
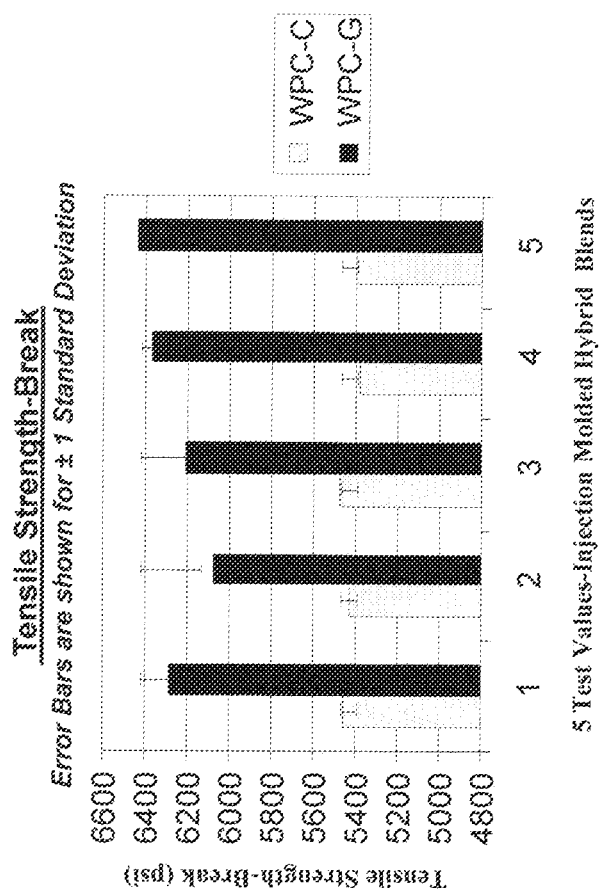
FIG. 1B is a plot of tensile strength-break at 23° Celsius and an elongation rate of 50 millimeters/minute as a function of polyolefin-cellulosic inclusion-maleated polymer content for an inventive composition with either 20% glass filled, chemically coupled, polypropylene (B-diamond data point)
Figure 2A:
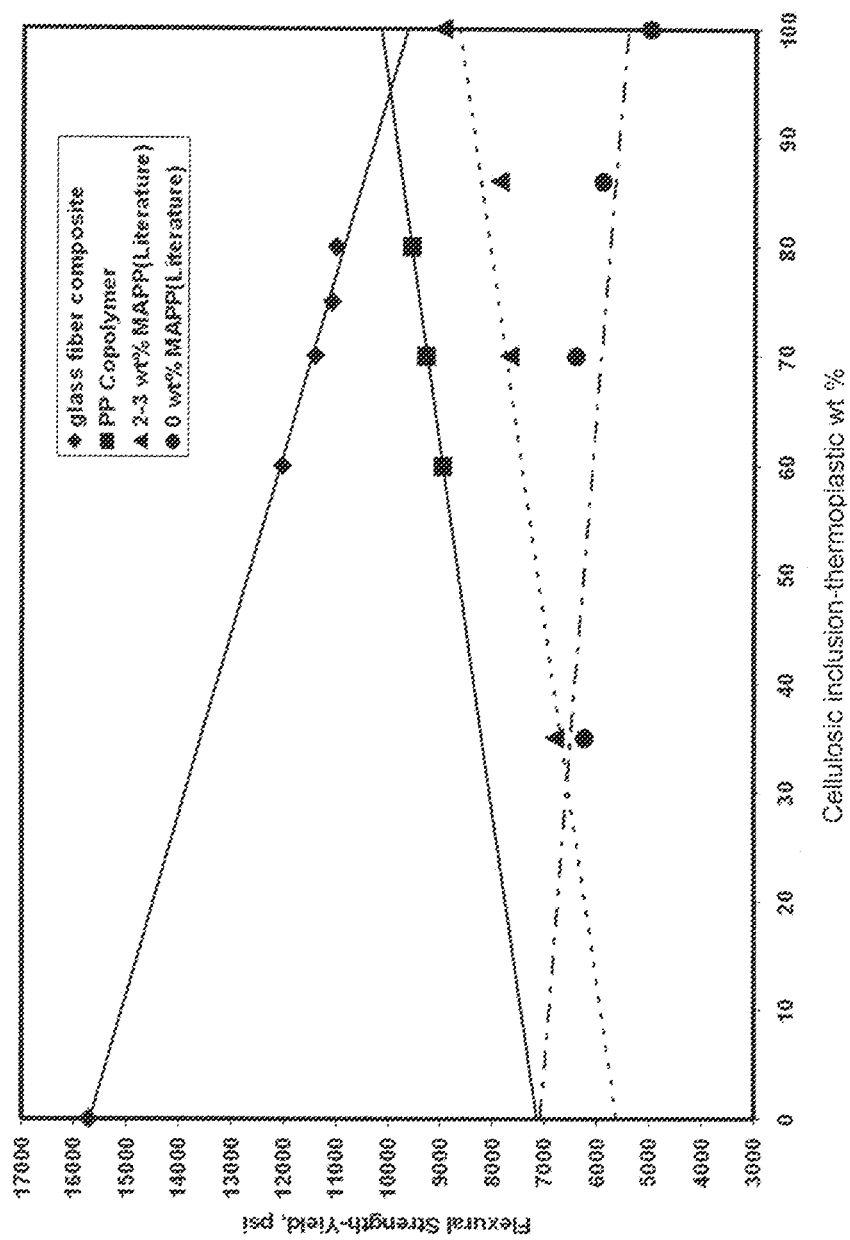
Figure 2B:
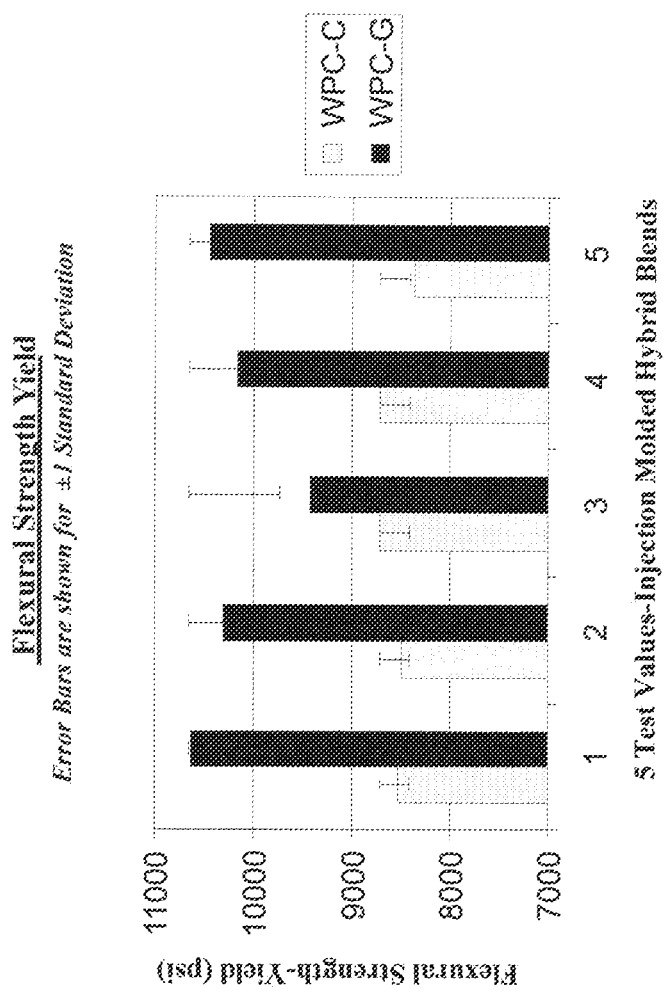
Figure 3A:
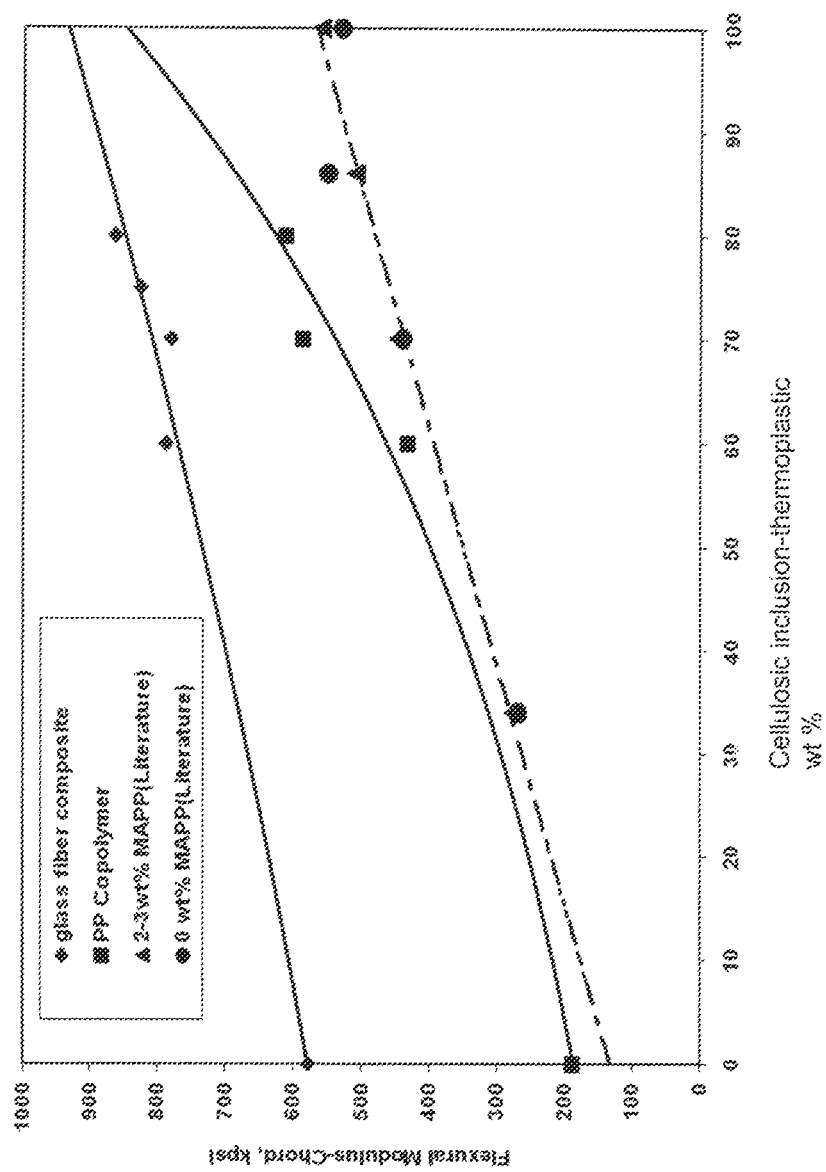
Figure 3B:
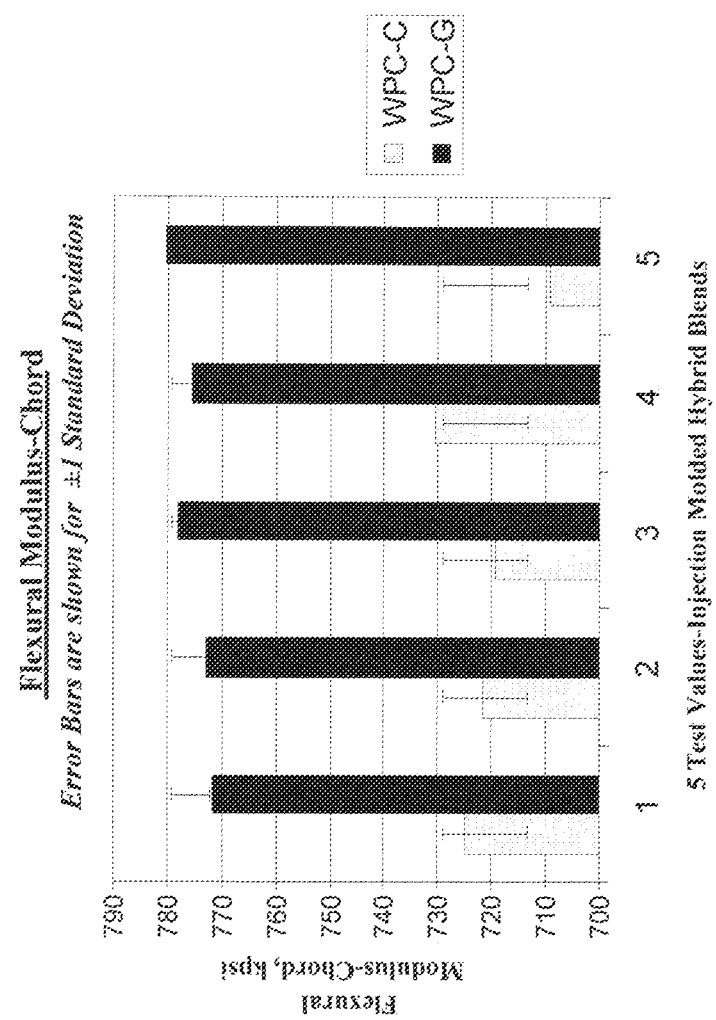
Figure 4:
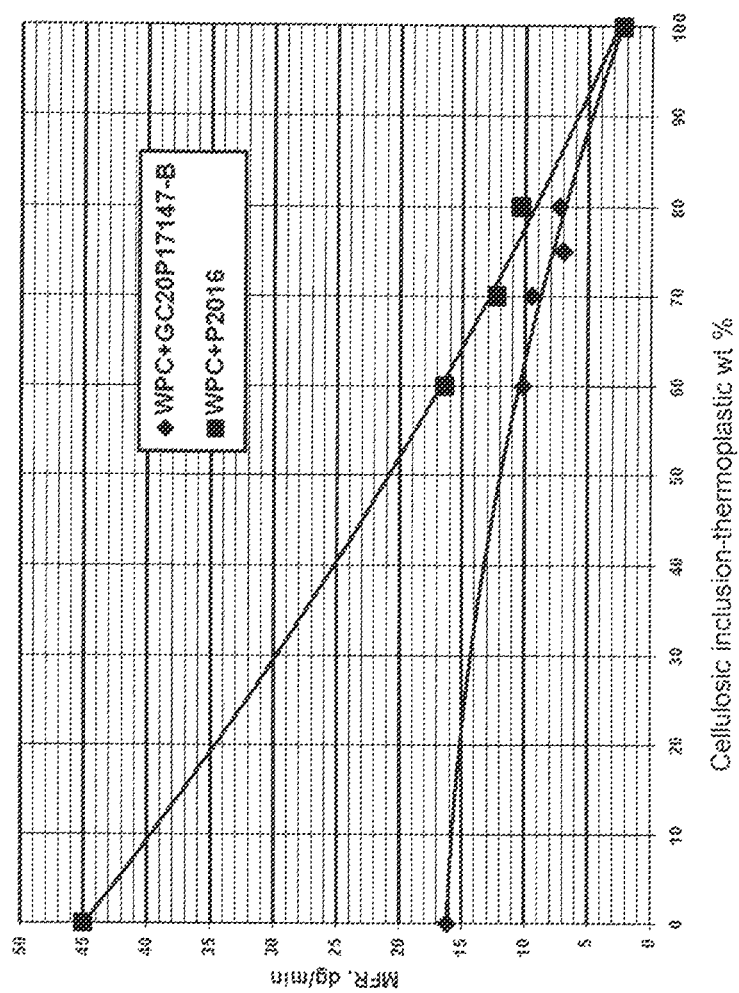

or polypropylene copolymer (C-square data point) with prior art compositions plotted for a cellulosic-thermoplastic devoid of maleic anhydride grafted polypropylene for a comparative formulation II (circle data point) and for a comparative formulation III of cellulosic material-thermoplastic containing 2-3% maleic anhydride grafted polypropylene (MAPP) and devoid of polar thermoplastic polymer resin (triangle data points);

FIG. 2A is a bar graph of flexural strength-yield for the compositions of Table 1;

FIG. 2B is a plot of flexural strength-yield for the compositions of FIG. 1B as a function of polyolefin-cellulosic inclusion-maleated polymer content;

FIG. 3A is a bar graph of flexural modulus-chord for the compositions of Table 1;

FIG. 3B is a plot of flexural modulus-chord for the compositions of FIG. 1 1B as a function of polyolefin-cellulosic inclusion-maleated polymer content; and FIG. 4 is a plot of melt flow rate for the compositions tested in FIGS. 1B, 2B and 3B.

DETAILED DESCRIPTION OF THE PREFERRED EMBODIMENTS

The present invention has utility as a cellulosic inclusion-thermoplastic material with superior properties relative to conventional wood polypropylene composites (WPCs). An inventive composition facilitates the production of a variety of articles that could not previously be formed with acceptable properties. One aspect of the present invention relates to a composition of a compounded wood-polyolefin pellet used for injection molding, extrusion, compression molding. The wood plastic compounded pellet contains wood flour at 1 to 80 total weight percent combined with a semi-crystalline polyolefin, such as a copolymer of polypropylene, a homopolymer of polypropylene or a homopolymer of polyethylene; and maleic anhydride, and minimal lubrication and the addition of polyamide (e.g. polyamide 6 or PA-6), a crystalline polymer.

One aspect of the present invention is premised on the inclusion of a polar thermoplastic resin to a wood particulate filled thermoplastic polyolefin. While maleic anhydride grafted polypropylene is a conventional addition to improve strength in WPCs, it has been surprisingly discovered that the addition of the polar thermoplastic resin operates synergistically with the maleic anhydride grafted polypropylene to further improve the properties of an article formed from the composition. The present invention also operates with a variety of maleated polymers to improve article properties relative to conventional WPCs.

As used herein, "total weight percent" with respect to an inventive cellulosic inclusion-thermoplastic composition is inclusive of a thermoplastic polyolefin matrix material, cellulosic inclusions, a maleated polymer, a polar thermoplastic polymer resin of polyamide or a polyester and conventional additives thereto such as pigments, colors, blowing agents, lubricants and plasticizers. Total weight percent as used herein specifically excludes noncellulosic reinforcements or fillers.

An inventive composition includes a plurality of cellulosic inclusions dispersed in a thermoplastic polyolefin matrix. A maleated polymer is present along with a polar thermoplastic polymer resin of a polyamide or a polyester so as to increase interaction between the cellulosic inclusions and the matrix as evidenced by an increased break tensile strength relative to a composition devoid of the resin.

Cellulosic inclusions operative herein illustratively include jute, switch grass, wheat straw, bamboo, wood, cotton, flax fiber, rice hulls, and combinations thereof. Cellulosic fibers represent a preferred form of cellulosic inclusion. More preferably, the cellulosic inclusions include wood fibers in a form commonly referred to in the art as wood flour. The preferred cellulosic reinforcement is a wood flour, but can be any combination of one or more other natural fibers, such as jute, switch grass, wheat straw, bamboo, wood, cotton, flax fiber, rice hulls, and combinations thereof. Sources of wood flour illustratively include pine, oak, maple, poplar, among other deciduous and coniferous woods. Through the use of wood flour that is a byproduct of other manufacturing processes, it is noted that a material that otherwise would end up in a landfill or incinerated is utilized to reduce overall environmental impact. It is appreciated that cellulosic inclusions vary greatly in water content based on the source and season of cellulosic inclusion usage. As water content is known to affect interfacial adhesion between wood flour and polypropylene, preferably a cellulosic inclusion in an inventive composition is dried to a cellulosic inclusion water content of preferably less than 15 weight percent of the inclusions and more preferably to less than 10 weight percent, and most preferably between 0.5 and 8 total weight percent of the inclusions being water before intermixing with other inventive composition components. Typically, cellulosic inclusions have a mean particle size of between 10 and 200 standard US mesh and preferably between 20 and 100 mesh, and most preferably between 40 and 80 mesh. It is appreciated that cellulosic inclusion processing to retain inherent fiber length of the inclusions promotes superior physical properties to the resultant article. Pre-pelletizing of the cellulosic inclusions or introduction thereof in later stages of compounding are known to facilitate cellulosic inclusion fiber length retention. The cellulosic inclusions are present in a composition from between 1 and 80 total weight percent and preferably between 20 and 70 weight percent, and most preferably between 30 and 60 weight percent of an inventive composition. The cellulosic inclusions are readily dispersed throughout a thermoplastic polyolefin matrix or provided in a graded density through coextrusion of varying composition or surface embossment of inclusions.

The thermoplastic polyolefin that forms the matrix in which the cellulosic inclusions and other inventive composition components are dispersed illustratively includes polyethylene, polypropylene, copolymers of propylene and ethylene, and mixtures of polypropylene and polyethylene. Preferably, the polyolefin is polypropylene and more preferably a copolymer of propylene and ethylene. The thermoplastic polyolefin according to the present invention has a melt flow index of between 1-100 dg per minute and more preferably between 20 and 80 dg per minute and most preferably a melt flow index of between 30 and 50 dg per minute. A thermoplastic polyolefin is typically present from 30 to 75 total weight percent of an inventive composition and preferably from 35 to 60 total weight percent. It is appreciated that the thermoplastic polyolefin need not be a virgin polyolefin and instead can include recycled polyolefins including those that are filled or reinforced with fibrous inclusions. In this way thermoplastic material that would otherwise be discarded in a landfill or incinerated is recycled into a molded article using an inventive composition. Preferably, the thermoplastic polyolefin has a melting temperature between 150 and 200° Celsius and more preferably between 155 and 175° Celsius.

A maleated polymer is present in an inventive composition and is characterized by a graft polymer in which maleic anhydride is graft copolymerized with a polymer. Maleated polymers operative in the present invention illustratively include a maleic anhydride grafted copolymer of polypropylene, maleated polyethylene, maleated copolymers or terpolymers of propylene containing acrylate and maleate, maleic anhydride grafted polystyrene, and combinations thereof. Preferably, the degree of maleation is between 0.1 and 5 maleic anhydride content as weight percent of the maleated polymer. Preferably, the degree of maleation is between 1 and 4 weight percent of the maleated polymer and most preferably between 1 and 2 weight percent. Typically, a maleated polymer is present in an inventive formulation in an amount of between 0.1 and 10 total weight percent and preferably between 1 and 5 total weight percent.

A polar thermoplastic polymer resin of a polyamide or polyester is also provided. The thermoplastic polar polymer resin is either aliphatic, aromatic, or a combination thereof. Specific polar thermoplastic polymer resins operative herein include polyamide-6, polyamide-66, polyamide-6-10, polyamide-46, polyphthalamide, polyethylene terephthalate (PET) polyester, and polycaprolactones. Preferably, the polar thermoplastic polymer resin is selected to have a melting temperature greater than the melting temperature of the thermoplastic polyolefin making up the bulk of the matrix in which the cellulosic inclusions are dispersed. The polar thermoplastic polymer resin has a melt flow index of between 1 and 100 dg per minute and preferably between 10 and 70 dg per minute and most preferably between 20 and 40 dg per minute. Preferably, the polar thermoplastic polymer resin is selected to have a melting temperature greater than the melting temperature of the thermoplastic polyolefin making up the bulk of the matrix in which the cellulosic inclusions are dispersed. Without intending to be bound to a particular theory, it is believed that the maleated polymer and the polar thermoplastic polymer resin chemically interact during processing to create polar thermoplastic polymer resin side chains extending from the maleated polymer that enhances interaction and dispersion in the base thermoplastic polyolefin and enhanced interaction with the cellulosic inclusions. As the subsequently detailed examples provide, enhanced thermal, mechanical and structural properties obtained in the resultant article include increased break tensile strength as measured at 23° Celsius and a cross-head speed of 50 millimeters per minute relative to a comparable composition lacking the polar thermoplastic polymer resin. Surprisingly, the processability of the polar thermoplastic resin is increased through incorporation into an inventive composition and polar thermoplastic polymer resin processing at temperatures below the conventional processing window for a particular polymer are noted.

Additional additives common to the industry are readily accommodated by an inventive formulation with these additives typically including pigments, colors, chemical or gas blowing agents, lubricants, thermal stabilizers, oxidation stabilizers, and plasticizers, with each of the additives being present in amounts typically ranging from 0.1 to 5 total weight percent for each.

These wood plastic compounded pellets, when combined and/or dry blended with a filled or compounded polyolefin pellet containing other natural fibers, glass fibers, minerals, lubrication, flame retardants, pigments and subsequently processed to make a wide variety of end-use composite. The wood plastic compounded pellets and glass fiber reinforced polypropylene pellets that are dry blended at the injection molded machine create a superior wood plastic compounded hybrid product that duplicate the flexural strength of dry wood of 1,000,000 psi.

Noncellulosic fillers and reinforcements are also optionally provided herewith and illustratively include rubber modified polypropylene; mineral fillers such as talc, calcium carbonate, mica, wollastonite, magnesium oxide, kaolin, nanoclay; noncellulosic fibers such as fibers of glass, carbon, aramid, PET polyester, viscose and ceramic. Rubber modified polypropylenes illustratively including rubbers of ethylene butene, ethylene octene, styrene butadiene, EPDM, latex, and saturated styrenic block copolymer (SEBS). Typically, a noncellulosic inclusion filler or reinforcement is present in an amount of between 0 and 20 parts by weight per part by weight of thermoplastic polyolefin.

To facilitate compounding of cellulosic inclusion thermoplastic composition with other types of filler or fiber reinforcements, all of the components are compounded together, or alternatively a cellulosic inclusion thermoplastic inventive composition is formed into pellets that are blended with noncellulosic inclusion filled or fiber reinforced polyolefinic pellets. It is appreciated that cellulosic inclusion filled pellets and noncellulosic filled pellets should be roughly melt temperature matched as to the polyolefin matrix to facilitate efficient formation of a hybrid extrudate.

Highly loaded wood fiber-reinforced polyolefin pellets may be mixed with pellets of a virgin and or recycled polyolefin and or pre-compounded glass fiber reinforced and or mineral and fed to an injection molding machine or other types of molten forming equipment to make plasticized hybrid blends to suit a variety of end-use molding applications. An injection molding machine or any type of plasticating extruder, provides the necessary mixing and fiber dispersion to combine unlike fiber reinforcement that have an admixture of high shear and low shear material properties. The flexibility of varying the blend ratio of wood plastic compounded pellet and other types of fiber reinforced polyolefin pellets, i.e. glass, jute, hemp, sisal is advantageous to the end-user. This provides the fabricator with a wide spectrum of end-use properties without the need for doing separate compounding extrusion of composites of specific composition.

An injection molding machine or any type of plasticating extruder provides the necessary mixing and fiber dispersion to combine unlike fiber reinforcement that have high shear and low shear properties. The flexibility of varying the blend ratio of inventive composition pellets and other types of filled or fiber reinforced polyolefin pellets is advantageous to the end user. This provides the fabricator with a wide spectrum of end-use properties without the need for doing separate compounding extrusion of composites of specific composition.

An inventive composition is readily melt blended and extruded with a different composition pellet in a process commonly referred to as "compounding". Blending and extruding is readily achieved using a twin screw extruder to mix, melt and blend the materials—this process is also used to simultaneously remove any moisture from the material— delivering an essentially "dry" extrudate which may be cut to form pellets. It is appreciated that an inventive composition containing only cellulosic inclusion and absent other fillers or fiber reinforcement is also provided.

The present invention is further detailed in the following nonlimiting examples. These examples are not intended to limit the scope of the appended claims to those specific formulations or results provided in these examples.

Example 1

The compounding extrusion of the wood plastic composite concentrate pellets was accomplished by using a 90 mm co rotating-intermeshing twin screw extruder having eight heated zones along a 40 L/D barrel. The elevated barrel temperature settings in the first three zones (480° F.) insure 100% softening of the PA-6 pellets. In spite of compounding at barrel jackets set as such elevated temperatures, there was no indication of the wood fiber degradation.

Polypropylene and other pelletized ingredients (MAPP and PA-6) were metered to the main feed port by an array of gravimetric feeders. The wood flour, that initially had 6-8 wt % water content, was fed directly to the extruder at a side feeder located downstream. A lubricant was also fed into the extruder. An atmospheric vent located just upstream of wood addition allowed for initial flashing of 2-3 wt % of water vapor. The disengagement and removal of the remainder of the water content occurred at the downstream vacuum port equipped with a vent stuffer to prevent entrainment of molten mass into the line to the vacuum pump. The discharge screws of the twin screw pumped the devolatilized WPC melt into a multi-hole die of the Gala underwater pelletizer having a rotating cutter blade arrangement to produce WPC concentrate pellets.

By operating at an high flow per die hole having a sufficiently large die hole diameter, wood plastic compounded pellets that were produced that retained an effective amount of sensible heat to promote flashing of entrained moisture off the pellet surface upon exiting the centrifugal dryer. Furthermore, by a combination of high extrudate velocities out of the die holes and compressive forces due to die pressures of 700-800 psi, the resulting pellets were compress having a density (>0.9 g/cc) due to a low degree of porosity.

As a consequence of the dynamic nature of the physical forces imposed on the melt extruder in the die holes, the wood plastic compounded pellets were covered by a polymer skin that functioned as a barrier layer that hindered absorption of residual surface water during the flash evaporation process along the Witte shaker table. The pellets had a low moisture content, e.g. <1 wt % moisture content. Besides the physical forces responsible for the formation of the outer skin, the polymeric skin is held tenaciously to the interior wood structure by strong adhesive forces. This interfacial adhesion was verified by pressing out wood plastic compounded pellets between polyester films in a Carver Press.

Example 2

The wood plastic compounded pellets were dried for a period of 4 hours to less than 1% percent moisture. These pellets were blended with pelletized 20 wt % glass fiber reinforced polypropylene copolymer at a 75:25 wt % blend ratio. The wood plastic compound hybrid compositions were then injection molded.

The barrel cylinder temperature settings of the injection molding press were 390° F. (zone 1), 380° F. (zone 2) and 370° F. (zone 3) with the nozzle temperature set at 375° F. and a mold temperature setting of 140° F. for both hybrid blends.

Example 3

An injection molder, having a single screw extruder, was charged with four pelletized materials. The first pellets were a wood composite compounded concentrate produced by MGP Ingredients. These compounded pellets would be dried for 8 hrs., prior to blending with other pellets, to reduce the moisture level of the pellets to essentially zero moisture. These wood concentrate pellets were identified as a 60/40 compounded blend. The 60 was actually 58% wood flour by weight and the 40 was a polypropylene by weight. The 2 percent, not mentioned in the 60/40 compounded blend, was a coupling agent for wood flour and polypropylene. The second pellet was an Exxon Mobile PP 7684KN a copolymer. The third pellet was a Fusabond coupling agent, a Dupont MD 353. The fourth pellet consisted of a black pigmented Nylon 66 pellet produced by Clariant. These pellets would be dry blended for 100 lbs. batch. The batch would then be vacuumed to the hopper to load the injection molding machine for extruding. The batch blend consisted of 73% wood concentrate, 24% Exxon Mobil copolymer, and 3% Clariant Nylon 66 black pigment. The injection molder had a single screw extruder with a 201 L/D and a barrier screw for transporting blend. The barrel profile was set at 400° F. in the throat of the machine and 380° F. in the last zone. The tool had one cavity that had a temperature of 80° F.

The injection molder was configured with gas assist to pressurize the wood plastic composite extrudate. The gas assist fluid was nitrogen. The nitrogent gas mixed with the wood plastic composite extrudate and compressed wood flour so that the walls of the molded article were solid in some areas and had small voids in other. More so, the nitrogen gas pressure closest to the injection point of the gate had no visible voids and to the extreme locations of the part away from the gas pressure there were voids.

Example 4

Table 1 provides the formulations for a comparative composition I lacking a polar polymer resin ingredient and an inventive composition A that is otherwise the same yet contains 3 total wt % polyamide but otherwise the same, and both having cellulosic inclusion of 58 total wt %, and 2 total wt % maleic anhydride grafted polypropylene (MAPP) pellets.

The compounding extrusion of composition pellets is accomplished by using a 50 mm co-rotating-intermeshing twin screw extruder having eight heated zones along a 40 L/D barrel. Polypropylene and other pelletized ingredients (MAPP and polyamide-6) are metered to the main feed port by an array of gravimetric feeders. The undried wood flour, that initially had 6-8 wt % water content, is fed directly to the extruder at a side feeder located downstream. A separate feed-stream of lubricant is also fed along with the wood flour to the side feeder to avoid any interference in the melting of the polyamide-6 in the upstream mixing zones. An atmospheric vent located just upstream of wood addition allows for initial flashing of 2-3 wt % of water vapor. The disengagement and removal of the remainder of the water content occurs at the downstream vacuum port equipped with a vent stuffer to prevent entrainment of molten mass into the line to the vacuum pump. The discharge screws of the twin screw pump the devolatilized melt into a multi-hole die of the Gala underwater pelletizer having a rotating cutter blade arrangement to produce composition pellets.

TABLE 1

Composition of Wood-Polypropylene Concentrate Pellets

| Ingredients | Comparative Composition I (total wt %) | Inventive Composition A (total wt %) |
|---|---|---|
| 45 dg per min. melt flow rate polypropylene copolymer | 39.5 | 36.5 |
| MAPP | 2.0 | 2.0 |
| Polyamide-6 | — | 3.0 |
| Pine wood flour: 40-60 mesh | 58.0 | 58.0 |
| Lubricant | 0.5 | 0.5 |

From each of the comparative composition I and the inventive composition A that contains polyamide-6 but is otherwise identical to the comparative, duplicate test bars were produced to allow for measurement of tensile strength (FIG. 1A), flexural strength yield (FIG. 2A), and flexural modulus-chord (FIG. 3A) for the compositions of Table 1. As noted for each of the five test values taken for each composition, the inventive composition containing the polar thermoplastic polymer resin had dramatically improved physical properties in all three tests.

Example 5

Compositions corresponding to those produced in Example 4 are provided with the exception that the amount of maleated polypropylene was reduced to 1.5 total weight percent and the amount of polyamide-6 was reduced from 3 to 2.25 percent relative to inventive composition WPC-G. Five duplicate samples for these compositions and observed increase in all three mechanical properties were still observed relative to the comparative example containing 1.5 weight percent maleated polypropylene as well as compared to WPC-C.

Example 6

Comparative composition II and inventive composition B (2% MAPP (2% maleic anhydride content) and 3 wt % polyamide-6 are post-dried in a hot air oven set at 108°-120° C. for a period of 4 hours prior to blending with pelletized 20 wt % glass fiber reinforced polypropylene copolymer at a 75:25 wt % blend ratio. The compositions are then molded using an injection molding press into a set of ISO tensile bars that were used to make test specimens for tensile, flexural, notched IZOD, HDT and ISO plaques for shrinkage measurements. In addition, filler content and melt flow rate were determined with cut pieces of the tensile bars.

By molding at temperatures below the thermal decomposition temperature of wood (<392° F.), the second heating history for the wood constituent in the inventive concentrate pellets has greatly reduced tendency for burning in the mold. The resulting physical properties are listed in Table 2. The hybrid blend of inventive pellet composition B with glass fiber has much greater tensile strength, flexural strength and flexural modulus than the hybrid blend of comparative II lacking the polyamide-6 constituent.

TABLE 2

Mechanical Properties of Injection Molded Hybrid Blends

| Hybrid Blend Properties:<br>75 wt % cellulosic-polyolefin Pellets +<br>25 wt % GFR PP Pellets | Comparative II | Inventive B |
|---|---|---|
| WPC compatabilizer package | 2 wt % MAPP<br>0 wt % PA-6 | 2 wt % MAPP<br>3 wt % PA-6 |
| Melt flow rate, dg/min | 8.2 | 6.3 |
| Filler content, wt % | 5.6 | 5.8 |
| Density g/cc | 1.095 | 1.096 |
| Tensile strength-break, psi @ 50 mm/min | 5,554 | 6,902 |
| Tensile elongation—Bk, % | 0.8 | 1.2 |
| Flexural strength-yield, psi @ 2 mm/min | 9,993 | 11,136 |
| Flexural modulus-chord, psi | 790,250 | 825,050 |
| Notched IZOD impact, ft-lb/in | 0.58 | 0.65 |
| HDT-0.45 MPa (° F.) | 311 | 313 |
| HDT-1.8 MPa (° F.) | 257 | 261 |
| Hardness | 67 | 66 |
| Mold shrinkage-Iso plaque after 48 hrs conditioning MD/TD % | 0.65/0.93 | 0.67/0.74 |

Example 7

The process of Example 6 is repeated with comparative composition containing a terpolymer of maleic anhydride grafted polystyrene present at 3 total weight percent and containing 2 percent maleic anhydride content based on the grafted polystyrene polymer weight. The inventive composition also contains 3 total weight percent PET polyester having a melt flow index of 37 dg per minute. Resultant injection molded test bars shows improved tensile, flexural, and notched IZOD performance for the inventive composition relative to comparative composition C.

Example 8

Pre-dried pellets are prepared according to the inventive composition of Table 1 with the exception that the levels of cellulosic inclusions, maleated polymer and polyamide-6 are varied. The pellets are mixed with either glass fiber reinforced composite pellets (Inventive B) or just neat polypropylene copolymer resin pellets (Inventive C) to yield a set of blend-ratios followed by injection molding to make ISO test specimens. The molded test samples have a MAPP present at 2 wt % and polyamide-6 present at 3 wt %. FIGS. 1B, 2B, 3B and 4 show linear or parabolic trend-line plots for the resulting melt flow rate and mechanical properties of the molded hybrid blends. These plots represent the potential for making a wide spectrum of molded products with an inventive composition ranging from 1 to 100 wt %. Comparative prior art data is also provided.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A cellulosic inclusion-thermoplastic composition comprising:
 a plurality of cellulosic inclusions;
 a thermoplastic polyolefin having a thermoplastic polyolefin melting temperature and forming a matrix in which said plurality of cellulosic inclusions are dispersed, the thermoplastic polyolefin being selected from the group consisting of: polyethylene, polypropylene, a copolymer of propylene and ethylene, and a mixture of polypropylene and polyethylene;
 a coupling polymer comprising a maleated polymer and present at a coupling polymer total weight percent; and
 a polar thermoplastic polymer resin of a polyamide or a polyester, said polar thermoplastic resin having a resin melting temperature and present at polar polymer total weight percent, said coupling polymer and said polar thermoplastic resin being dispersed and interacting synergistically to promote adhesion between said plurality of cellulosic inclusions such that the composition has an increased break tensile strength as measured at 23° Celsius and at an cross-head speed of 50 millimeters per minute relative to a composition devoid of said resin, wherein the coupling polymer total weight percent is present between 0.1 to 10 total weight percent and the polar polymer total weight percent is present between 1 to 10 total weight percent, and said plurality of cellulosic inclusions has a moisture content of less than 10 weight percent of said plurality of cellulosic inclusions and the composition has a density between 0.9 and 1.096 grams per cubic centimeter.

2. The composition of claim 1, wherein the thermoplastic polyolefin is a polypropylene.

3. The composition of claim 1, wherein said thermoplastic polyolefin is a copolymer of propylene and ethylene.

4. The composition of claim 1, wherein said polyolefin is a mixture of polypropylene and polyethylene.

5. The composition of claim 1, wherein said polar thermoplastic polymer resin is said polyamide.

6. The composition of claim 1, wherein said coupling polymer total weight percent is 2 to 4 total weight percent and the polar polymer total weight percent is between 2 to 4 total weight percent, and said plurality of cellulosic inclusions has a moisture content of less than 1 weight percent of said plurality of cellulosic inclusions.

7. The composition of claim 6 wherein the resin melting temperature is greater than the thermoplastic polyolefin melting temperature.

8. The composition of claim 6 wherein said plurality of cellulosic inclusions comprise wood flour.

9. The composition of claim 1 further comprising a mineral or inorganic filler or fibrous reinforcement.

10. The composition of claim 1 wherein said plurality of cellulosic inclusions have a size of between 10 and 200 mesh.

11. The composition of claim 1 wherein said plurality of cellulosic inclusions have a size of between 20 and 100 mesh.

12. The composition of claim 1 wherein said plurality of cellulosic inclusions have a size of between 40 and 80 mesh.

13. A method of making the composition of claim 1 comprising:
blending a thermoplastic olefin, a plurality of cellulosic inclusions, a coupling polymer, and polar thermoplastic resin of a polyamide or a polyester to form a blend; and
forming said blend to form a solid article by extrusion through a die with die pressures of 700-800 psi in which said coupling polymer and said polar resin interact synergistically to promote adhesion between said plurality of cellulosic inclusions and said thermoplastic olefin as noted by an increased break tensile strength as measured at 23° Celsius and at an cross-head speed of 50 millimeters per minute relative to a composition devoid of said resin.

14. The method of claim 13 wherein the blending is melt blending and the forming is by extruding.

15. The method of claim 14 wherein melt blending is at or below a temperature that is a melting point of said polar thermoplastic resin.

16. The method of claim 13 further comprising drying said plurality of cellulosic inclusions prior to the blending.

17. The method of claim 13 wherein said article is an injection moldable pellet.

18. The method of claim 17 further comprising melt blending said pellet with a secondary thermoplastic olefin.

19. The method of claim 18 wherein said secondary thermoplastic olefin is polypropylene.

20. The method of claim 17 wherein said secondary thermoplastic olefin is a virgin polyolefin, a recycled polyolefin, a filled polyolefin, or a fiber-reinforced polyolefin.

21. The method of claim 20 wherein said filled polyolefin or said fiber-reinforced polyolefin comprises a filler or fiber of mineral particulate, noncellulosic fibers, and noncellulosic rubbers.

22. A cellulosic inclusion-thermoplastic composition comprising:
a plurality of cellulosic inclusions comprising cellulosic fibers or flour;
a thermoplastic polyolefin having a thermoplastic polyolefin melting temperature and forming a matrix in which said plurality of cellulosic inclusions are dispersed, the thermoplastic polyolefin being selected from the group consisting of: polyethylene, polypropylene, a copolymer of propylene and ethylene, and a mixture of polypropylene and polyethylene;
a coupling polymer comprising a maleated polymer and present at a coupling polymer total weight percent; and
a polar thermoplastic polymer resin of a polyamide or a polyester, said polar thermoplastic resin having a resin melting temperature and present at polar polymer total weight percent, said coupling polymer and said polar thermoplastic resin interacting synergistically between said plurality of cellulosic inclusions such that the composition has an increased break tensile strength as measured at 23° Celsius and at an cross-head speed of 50 millimeters per minute relative to a composition devoid of said resin, wherein the coupling polymer total weight percent is present between 0.1 to 10 total weight percent and the polar polymer total weight percent is present between 1 and 10 total weight percent, and said plurality of cellulosic inclusions has a moisture content of less than 10 weight percent of said plurality of cellulosic inclusions and the composition has a density of between 0.9 and 1.096 grams per cubic centimeter.

23. The composition of claim 22 wherein said plurality of cellulosic inclusions have a size of between 10 and 200 mesh.

24. The composition of claim 22 wherein said plurality of cellulosic inclusions have a size of between 20 and 100 mesh.

25. The composition of claim 22 wherein said plurality of cellulosic inclusions have a size of between 40 and 80 mesh.

* * * * *